Aug. 11, 1964  R. P. MAZZAGATTI ETAL  3,144,090
ACOUSTICAL WELL LOGGING TOOL HAVING LOW
ACOUSTICAL VELOCITY BETWEEN TRANSDUCERS
Filed Feb. 10, 1959  2 Sheets-Sheet 2
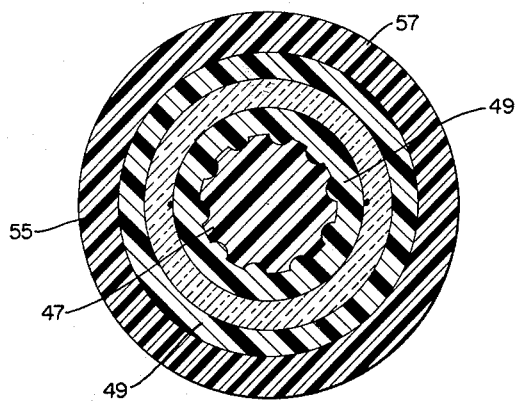
Fig. 4
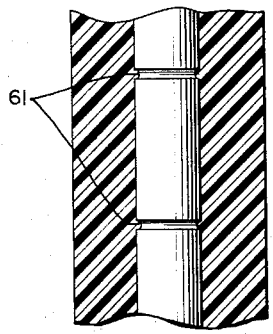
Fig. 5
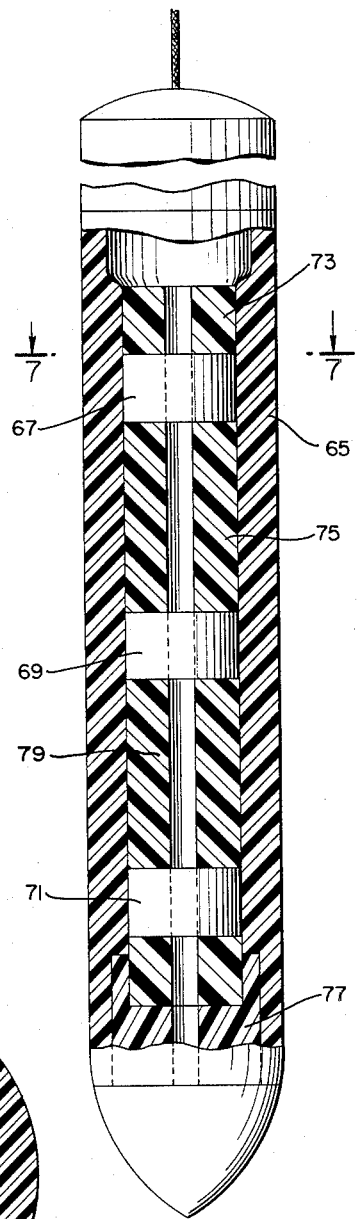
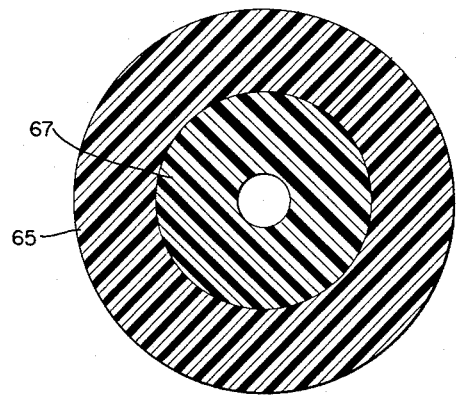
Fig. 7
Fig. 6

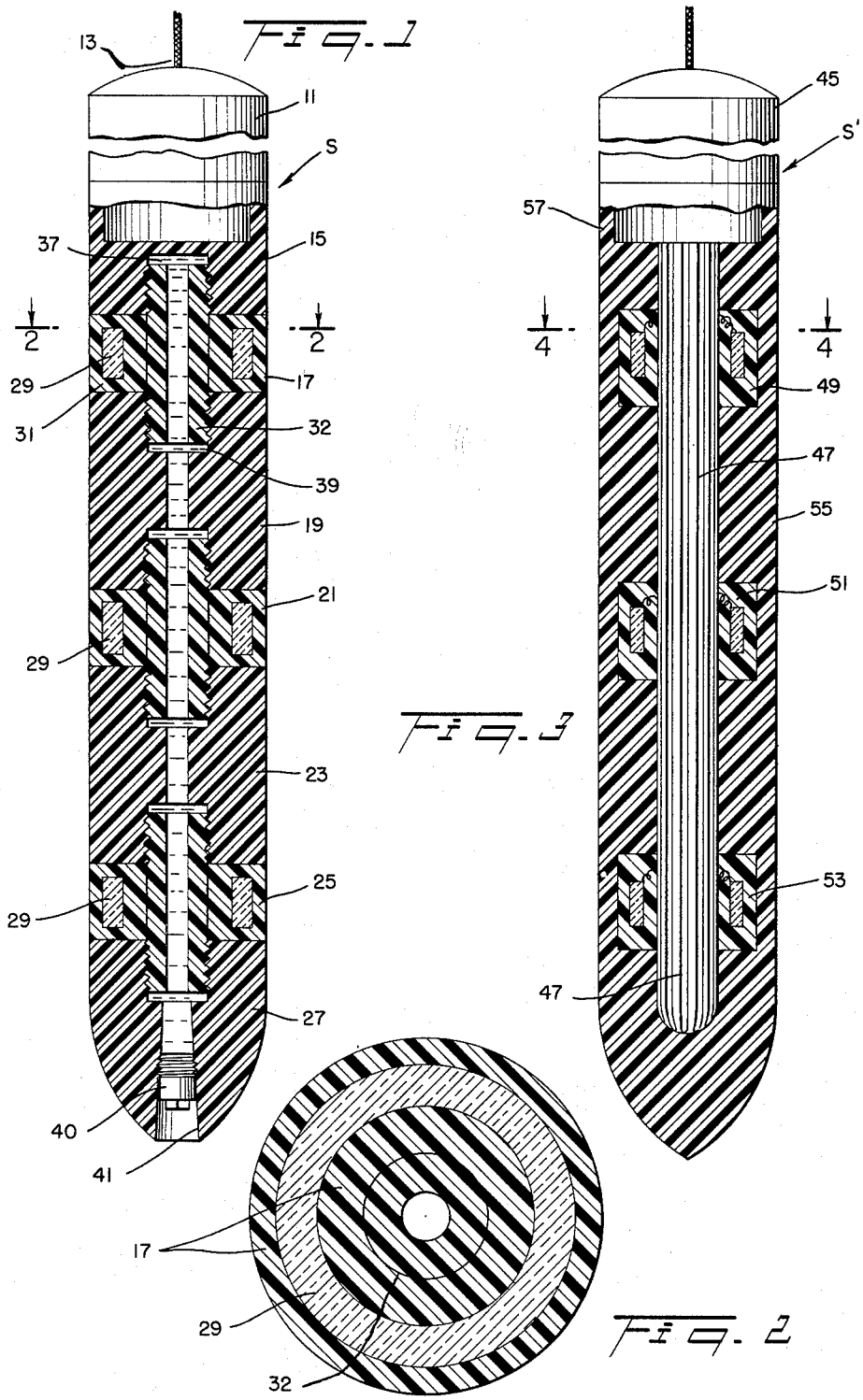

United States Patent Office 3,144,090
Patented Aug. 11, 1964

3,144,090
ACOUSTICAL WELL LOGGING TOOL HAVING LOW ACOUSTICAL VELOCITY BETWEEN TRANSDUCERS
Roy P. Mazzagatti, Bellaire, and Kerry D. Savage and Donald J. Dowling, Houston, Tex., assignors to Texaco Inc., a corporation of Delaware
Filed Feb. 10, 1959, Ser. No. 792,391
6 Claims. (Cl. 181—.5)

The present invention relates to a novel acoustical well logging tool having an acoustical transmitter element and either one or a plurality of acoustical receiver elements for signal detection, in which the acoustic signal speed through the instrument itself is suppressed to such an extent that signals are transmitted through the instrument at a much slower speed than through the adjoining earth formations along the length of a borehole.

Acoustical well logging systems and tools are described in such patents as 2,704,364 and 2,722,282. In general such a tool comprises a long thin sonde having a single supersonic transmitting transducer and one or more supersonic receiving transducers spaced longitudinally from the transmitting transducer and from one another, spacing being maintained by connecting spacer members of sufficient strength to maintain a constant spacing as the logging sonde is moved along the length of a borehole. The transducers ordinarily are piezo electric (electrostrictive) transducer elements such as barium titanate or lead zirconium titanate which may be embedded within a matrix of a synthetic resin such as polymethyl methyacrylate (Lucite) or an epoxy resin, or may be mechanically supported in other ways.

When logging a borehole an accurate recording of sound velocity in the surrounding formations requires that the speed of sound transmission from the transmitting transducer through the instrument itself to one or more receiving transducers must be slower than through the adjoining formation. If sound transmission through the instrument is faster than through the adjoining formation, the instrument will give a reading which is erroneous and useless for interpreting the nature of the formations along the borehole.

We have found that the range velocity of measurement of an acoustical logging instrument can be considerably broadened by limiting the velocity of sound transmission through the instrument itself to a value which is lower than the acoustical velocity in the drilling mud surrounding the instrument within the hole, ordinarily about 5000 feet per second. We have accomplished this by so constructing the logging tool that the spaced transducer elements are connected together by one or more structural members formed of at least one substance selected from the group consisting of a tetrafluoroethylene resin and an organosilicon oxide high polymer having elastic properties. We have used successfully a tetrafluoroethylene resin sold commercially under the trade name "Teflon" by E. I. du Pont de Nemours and Co. This resin is a high polymeric completely fluorinated plastic material obtained by polymerizing tetrafluorethylene gas. Its chemical composition and properties are given in Du Pont Information Bulletin, Polychemicals Department No. X-7, page 1, and in "The Teflon Story" in Du Pont Plastics Bulletin #46, vol. 12, pages 183–185. Properties of this material are also discussed in detail in "Encyclopedia of Chemical Technology," Kirk-Othmer, vol. 11, pages 687–691.

We have also used successfully a dimethyl silicone high polymer, generally known as silicone rubber, and sold commercially under the trade name "Silastic" by the Dow Corning Corporation. This material is rubbery, tough and heat stable, remaining elastic and compressible at 150° C., and even being usable at temperatures up to 250° C. It is molded to shape by compression methods and then cured, as described in "Preliminary Data—New Dow Corning Products" issued April 23, 1945, by the Dow Corning Corporation. Further information as to the chemical and physical properties of suitable silicone rubber can be found on pages 94–97 "Chemistry of the Silicones" by Eugene G. Rochow, second edition published by John Wiley & Sons, Inc., together with accompanying bibliography. Reference is also made to Kirk-Othmer ibid, page 843.

We have found, unexpectedly, that Teflon has an acoustic velocity of about 4000 feet per second which is only about 85% that of water; and Silastic silicone rubber's acoustic velocity is about 3000 feet per second. For this reason, these materials can be very effectively employed for connecting together the transducer elements of an acoustical logging tool. Furthermore, they have sufficient strength to assure the continued constantly spaced connection of the transducer elements with one another during the logging of a borehole.

When used at high pressures and temperatures, space within the connecting members may be filled with a suitable liquid having a low acoustic velocity (below 5000 feet per second), for example a good quality vacuum pump oil, carbon tetrachloride plus oil, or a silicone oil such as Dow Corning 200 a polymerized dimethyl silicone, having acoustic velocities of approximately 4,780, 3000 and 2760 feet per second, respectively.

In another embodiment of the invention we have found that the strength of the connecting members may be augmented by a sleeve of a strength providing material such as Silastic or Neoprene. Neoprene is a synthetic rubber like material made by polymerizing 2-chloro-1,3-butadiene. Neoprene which has an acoustic velocity of 5000 to 5840 feet per second, is described in detail in the "Encyclopedia of Chemical Technology" Kirk-Othmer, vol. 11, pages 852, 853–856 and 893. Such a strengthening material may be molded around the transducer elements and the connecting members as a jacket which may or may not be vulcanized and bonded to the acoustical elements. It may merely conform to the Teflon connecting members.

These combinations of plastic materials provide improved characteristics of mechanical strength, flexibility and length stability while also achieving low sound transmission speed, or in the case of Neoprene at least a suitable compromise low speed of sound transmission through the instrument itself which is still maintained at a level sufficiently low not to interfere with the measurement of acoustic velocity through the surrounding formations.

The invention will be described more in detail with reference to the accompanying drawings, wherein:

FIG. 1 is a schematic vertical sectional view, parts being broken away and in elevation, of an acoustical logging sonde wherein three transducer elements are connected together by low velocity plastic spacer members only;

FIG. 2 is a cross-sectional view on an enlarged scale taken along the lines 2—2 in FIG. 1;

FIG. 3 is a longitudinal sectional view, parts being broken away and in elevation, of a modified form of acoustical well logging tool wherein the transducer elements are connected together by a low velocity plastic rod connecting member surrounded by a sleeve;

FIG. 4 is a cross-sectional view taken along the line 4—4 in FIG. 3;

FIG. 5 is a fragmentary vertical sectional view of still another modified form of the invention similar to that of FIG. 3, but having a modified construction for assuring a tight connection of the sleeve to the connecting member;

FIG. 6, is a longitudinal sectional view, parts being broken away and in elevation, of still another acoustical well logging tool having a modified construction of connecting members and sleeve; and FIG. 7 is a cross-sectional view taken along the line 7—7 in FIG. 6.

Referring to FIGS. 1 and 2, there is shown a sonde S comprising a metal housing 11, which includes the sonde electronics section, having a cable 13 for suspending the sonde and conducting current. On the lower end of the housing there are secured in series a Teflon connecting member 15 which is sleeved over and bonded to the lower end of member 11, a transmitting transducer 17, a second Teflon connecting member 19, a first receiving transducer 21, a third Teflon connecting member 23, a second receiving transducer 25 and a Teflon bull plug 27. Some or all of the connecting members alternatively can be constructed of silicone rubber.

All three of the transducers may have similar construction, as will be described in connection with the element 17. A hollow cylindrical piezo electric (electrostrictive) transducer element 29 of barium titanate, lead zirconium titanate or other suitable substance is embedded within a cylindrical matrix 31 of epoxy or other suitable plastic material. Passing through the transducer is a hollow connecting rod 32 made of low velocity material such as Teflon with projecting threaded ends such that they may thread into corresponding bores 37 and 39 in spacer members 15 and 19 respectively.

The transducer elements are electrically connected in a well known manner into the electrical circuit of the acoustic system so as to provide a continuous record of the sound velocity through adjoining formations resulting from the signal transmitted by the element 29 and received by the elements in receiving transducers 21 and 25.

In the particular modification shown, the acoustic elements and the connecting members are all hollow with liquid-filled interconnecting bores for the wires. However, good results also can be obtained with wires molded into solid elements, and using no internal liquid. Furthermore, the members 27 and 15 at the bottom and top of the acoustic system need not necessarily be Teflon or silicone rubber, which is only essential between the several transducers.

A pressure equalizing device 40 in a bore 41 at the bottom of the sonde assures that the pressures in the hole and inside the sonde are equalized to prevent fluid leakage into or out of the sonde. Device 40 may be a bellows, diaphragm, or piston.

Referring to FIGS. 3 and 4, a logging soude S' comprises a metal housing 45, a long thin longitudinally corrugated Teflon rod 47, a series of three longitudinally spaced hollow cylindrical acoustical transducers 49, 51 and 53 which are slipped over the rod and frictionally secured thereon, and a surrounding jacket or sleeve 55 of Neoprene or Silastic. Jacket 55 may be molded tightly over or molded and stretched tightly over the acoustical elements and the Teflon rod, or rods and at its upper end comprises a sleeve 57 which is secured over the lower end of metal member 45. Silicone rubber can be used for either or both rod 47 and sleeve 55.

The corrugations assure that the sleeve will be rigidly secured to the Teflon rod although actual bonding of the two materials to one another may not occur. The Neoprene sleeve, of course, may or may not bond to the plastic material forming the matrix in the acoustical elements 49, 51 and 53.

With the FIG. 3 construction a compromise low velocity between that of the Teflon rod and the Neoprene sleeve is achieved which is still sufficiently low compared to the velocity characteristics of most drilling muds and water that the transmission of sound from the transmitting transducer 49 through the instrument to the receiving transducers 51 and 53 is a a rate lower than through most earth formations. When the sleeve is silicone rubber, of course, the acoustic velocity through the instrument is lower than with Neoprene.

Referring to FIG. 5, the only difference from the FIG. 3 tool is that the Neoprene sleeve is secured on the Teflon rod through the agency of circumferential grooves 61 in the rod instead of longitudinal corrugations.

In the modification of FIGS. 3 to 5 the manner of molding the Neoprene or silicone rubber sleeve and the Teflon rod into a unitary structure is well within the skill of the art, the basic principles being described in the publications listed hereinabove.

FIGS. 6 and 7 show a modified composite structure wherein a sleeve 65 of a polymerized dimethyl silicone resin sold by the Dow Corning Corp. under the name "Silastic" encloses the transducers 67, 69, 71 which are spaced apart by spacer members 73, 75, and 77 of Silastic and a spacer member 79 of Teflon between the two receiving transducers 69 and 71. The voids within this acoustic assembly may be filled with a low velocity fluid as in FIG. 1.

In this construction the spacer members and transducers have the same cylindrical shape and diameter and are held together by the elastic properties of the outer sleeve.

Obviously, many modifications and variations of the invention, as hereinbefore set forth, may be made without departing from the spirit and scope thereof, and therefore only such limitations should be imposed as are indicated in the appended claims.

We claim:

1. An acoustical well logging tool comprising axially aligned supersonic receiving and transmitting transducers spaced from one another longitudinally of said tool, and a connecting member between said transmitting transducer and said receiving transducer of polymerized tetrafluoroethylene resin characterized by an acoustical velocity less than 5000 feet per second.

2. An acoustical well logging tool in accordance with claim 1 wherein said connecting member is wholly formed of said material so selected.

3. An acoustical well logging tool comprising axially aligned supersonic receiving and transmitting transducers spaced from one another longitudinally of said tool, and at least one spacer member threadedly connected between adjacent ones of said transducers and formed at least partially of tetrafluoroethylene resin, characterized by an acoustical velocity of less than 5000 feet per second to suppress the rate of sound transmission from said transmitting transducer to said receiving transducer.

4. An acoustical well logging tool comprising a single supersonic transmitting transducer and a plurality of supersonic receiving transducers aligned axially therewith on the same side thereof and spaced longitudinally from said transmitting transducer and from one another, and spacer members between each pair of said transducers connecting said transducers together, said spacer members being formed of tetrafluoroethylene resin, characterized by an acoustical velocity less than 5000 feet per second.

5. An acoustical well logging tool in accordance with claim 4 wherein said transducers and said connecting members are provided with inter-communicating passageways for electrical conductors and wherein said passageways are filled with a liquid having an acoustical velocity less than 5000 feet per second.

6. An acoustical well logging tool in accordance with claim 3 wherein each of said transducers comprises a hollow cylindrical transducer element comprising an electrostrictive substance embedded within a cylindrical matrix of plastic material, and a hollow connecting rod passing through said hollow cylindrical transducer element and having projecting externally threaded ends threaded into said spacer members, said rod being formed of a resin having high temperature strength and characterized by an acoustical velocity of less than 5000 feet per second.

References Cited in the file of this patent

UNITED STATES PATENTS

| | | |
|---|---|---|
| 2,200,476 | Mounce | May 14, 1940 |
| 2,233,992 | Wyckoff | Mar. 4, 1941 |
| 2,708,485 | Vogel | May 17, 1955 |
| 2,722,282 | McDonald | Nov. 1, 1955 |
| 2,742,629 | Summers et al. | Apr. 17, 1956 |
| 2,834,421 | Summers | May 13, 1958 |
| 2,868,311 | Tullos | Jan. 13, 1959 |
| 2,897,478 | Summers et al. | July 28, 1959 |

OTHER REFERENCES

Whitby: Synthetic Rubber, published by John Wiley & Sons, Inc., New York, 1954., pp. 910–918 relied on.